US007859538B2

(12) United States Patent
Isner et al.

(10) Patent No.: US 7,859,538 B2
(45) Date of Patent: Dec. 28, 2010

(54) CONVERTING DEFORMATION DATA FOR A MESH TO ANIMATION DATA FOR A SKELETON, SKINNING AND SHADING IN A RUNTIME COMPUTER GRAPHICS ANIMATION ENGINE

(75) Inventors: Michael Isner, Santa Monica, CA (US); Javier Nicolai von der Pahlen, New York, NY (US); Thomas Ho-min Kang, Venice, CA (US)

(73) Assignee: AUTODESK, Inc, San Rafael, CA (US)

( * ) Notice: Subject to any disclaimer, the term of this patent is extended or adjusted under 35 U.S.C. 154(b) by 596 days.

(21) Appl. No.: 11/496,241

(22) Filed: Jul. 31, 2006

(65) Prior Publication Data

US 2008/0024487 A1    Jan. 31, 2008

(51) Int. Cl.
*G06T 15/70* (2006.01)
(52) U.S. Cl. ........................................ 345/473; 345/474
(58) Field of Classification Search .................. 345/473
See application file for complete search history.

(56) References Cited

U.S. PATENT DOCUMENTS

| | | | |
|---|---|---|---|
| 5,767,861 A | 6/1998 | Kimura | |
| 5,852,450 A | 12/1998 | Thingvold | |
| 5,966,141 A | 10/1999 | Ito et al. | |
| 6,166,746 A | 12/2000 | Inada et al. | |
| 6,203,425 B1 | 3/2001 | Hayashi | |
| 6,215,496 B1 | 4/2001 | Szeliski et al. | |
| 6,326,972 B1 | 12/2001 | Buhler et al. | |
| 6,377,281 B1 | 4/2002 | Rosenbluth et al. | |
| 6,503,144 B1 | 1/2003 | Rimoto et al. | |

(Continued)

FOREIGN PATENT DOCUMENTS

JP        09-330424        6/1996

(Continued)

OTHER PUBLICATIONS

Florian Loitsch, "Maya File Translator," 2004. http://florian.loitsch.com/gpExport/oldDocs/report.html.*

(Continued)

*Primary Examiner*—Daniel F Hajnik
(74) *Attorney, Agent, or Firm*—Patterson & Sheridan, LLP (57) ABSTRACT

Animation of an object from a character modeling and/or animation tool is converted from a representation used by that tool to a representation used in a runtime animation system, such as a game engine. Such a tool typically represents the object using a source structure and a source skin. The runtime animation engine typically uses a target structure, target skin and shading to represent animation of an object. In addition to transferring motion of the object from its source structure to the target structure, deformation and shading also are converted. Low resolution information about the deformation of the source skin is converted into a set of skinning weights for associating the target skin with virtual bones added to the target structure and animated deformation data for each frame of animation. High resolution detail from the deformation of the source skin is converted into a set of normal maps, one or more masks and animated mask parameters for use by one or more shaders.

20 Claims, 5 Drawing Sheets

U.S. PATENT DOCUMENTS

| | | | |
|---|---|---|---|
| 6,522,332 | B1 | 2/2003 | Lanciault et al. |
| 6,535,215 | B1 | 3/2003 | DeWitt et al. |
| 6,626,759 | B1 | 9/2003 | Matsuoka |
| 6,697,071 | B2 | 2/2004 | Iino et al. |
| 6,976,918 | B2 | 12/2005 | Hosokawa |
| 7,012,608 | B1 | 3/2006 | Fujisaki |
| 7,068,277 | B2 | 6/2006 | Menache |
| 7,102,647 | B2 * | 9/2006 | Sloan et al. .............. 345/584 |
| 7,104,890 | B2 | 9/2006 | Tsuda et al. |
| 7,106,334 | B2 | 9/2006 | Imagawa et al. |
| 7,126,607 | B2 | 10/2006 | Emerson |
| 7,168,953 | B1 | 1/2007 | Poggio et al. |
| 7,221,380 | B2 | 5/2007 | Hunter et al. |
| 7,251,593 | B2 | 7/2007 | Dariush et al. |
| 7,253,817 | B1 | 8/2007 | Plantec et al. |
| 7,515,155 | B2 * | 4/2009 | Anderson et al. .......... 345/473 |
| 2001/0004262 | A1 | 6/2001 | Mochizuki et al. |
| 2002/0050997 | A1 | 5/2002 | Iino et al. |
| 2002/0067363 | A1 | 6/2002 | Ohto et al. |
| 2003/0164829 | A1 | 9/2003 | Bregler et al. |
| 2003/0193503 | A1 | 10/2003 | Seminatore et al. |
| 2004/0001064 | A1 * | 1/2004 | Boyd et al. ................. 345/473 |
| 2004/0012594 | A1 | 1/2004 | Gauthier et al. |
| 2004/0036689 | A1 * | 2/2004 | Chiu .......................... 345/473 |
| 2004/0160445 | A1 | 8/2004 | Whatmough |
| 2004/0179013 | A1 | 9/2004 | Menache |
| 2006/0061574 | A1 | 3/2006 | Ng-Thow-Hing et al. |
| 2006/0139355 | A1 | 6/2006 | Tak et al. |
| 2006/0181535 | A1 | 8/2006 | Watt |
| 2006/0262119 | A1 | 11/2006 | Isner |
| 2006/0274070 | A1 | 12/2006 | Herman et al. |
| 2007/0024632 | A1 | 2/2007 | Couture-Gagnon |
| 2007/0030266 | A1 * | 2/2007 | Styles ........................ 345/420 |

FOREIGN PATENT DOCUMENTS

| | | |
|---|---|---|
| JP | 11-185055 | 12/1997 |

OTHER PUBLICATIONS

Antony Ward, Game Character Development with Maya, 2004, New Riders.*

Sumner, R. W. and Popović, J. 2004. Deformation transfer for triangle meshes. ACM Trans. Graph. 23, 3 (Aug. 2004), 399-405. DOI=http://doi.acm.org/10.1145/1015706.1015736.*

James, Doug L., et al, "Skinning Mesh Animations", SIGGRAPH '05: ACM Siggraph 2005 Papers, 2005, XP002468241, pp. 399-407.

Mohr, Alex, et al, "Building Efficient, Accurate Character Skins From Examples", ACM Transactions On Graphics, vol. 22, No. 3, Jul. 2003, XP002468240, pp. 562-568.

Office Action. U.S. Appl. No. 12/220,254 dtd. Aug. 20, 2009.

English Translation of JP 11-185055, 1999.

English Translation of JP 09-330424, 1997.

Motobayashi et al. "Assimilated Motion Generation for Characters with Various Features," Journal of Institute of Electronics, Information and Communication Engineers, Information and System II—Pattern Processing, Japan, Jul. 1, 2004, vol. J87-D-II, No. 7, pp. 1473-1486.

English Abstract of "Motobayashi et al." (Provided as explanation of relevance), 2009.

Yukawa et al. "Human Motion Description System Using BUYO-FU," Journal of Information Processing Society of Japan, Japan, Information Processing Society of Japan, Oct. 15, 2000, vol. 41, No. 10, pp. 2873-2880.

English abstract of "Yukawa et al." (provided as explanation of relevance), 2009.

Gleicher, Michael. "Retargetting Motion to New Characters," Proceedings of SIGGRAPH 98, pp. 33-42, Jul. 1998.

* cited by examiner

CONVERTING DEFORMATION DATA FOR A MESH TO ANIMATION DATA FOR A SKELETON, SKINNING AND SHADING IN A RUNTIME COMPUTER GRAPHICS ANIMATION ENGINE

BACKGROUND

Electronic games commonly use three dimensional modeling, animation and rendering techniques to achieve realistic characters, playing environments and interaction. Some electronic game platforms, such as the Sony PLAYSTATION Nintendo GAMECUBE and Microsoft XBOX game consoles, have "engines" which render three-dimensional animations in real time during play, i.e., at runtime. Example game engines include, but are not limited to, Source from Valve and Unreal from Epic.

These game engines generally represent a character as a skeleton with an associated envelope or skin to which color and textures are applied using a process called shading. A skeleton typically is defined by a set of interconnected or related bones. The envelope or skin typically is defined as a three-dimensional mesh. A set of envelope weights or skinning weights defines the relationship between bones in the skeleton and the vertices in the mesh defining the envelope or skin. The process of defining these weights is called skinning. Animation is applied to the skeleton. The set of envelope weights determines how the mesh deforms in response to movement of the skeleton. A set of normal maps affects how shading is applied to the mesh. The envelope weights and normal maps can be animated over time.

When games are developed, various three-dimensional modeling, animation and rendering tools are used by artists to define the characters and the environments of the games. Typically, these artists work with models with a higher resolution than the resolution used in the game engine. Further, a tool used for creating a model or animation may represent characters and animation in a way that is different from the representation used in the game engine. In particular, if the representation of motion, deformations and shading of the mesh in the tool is different from the representation in the game engine, the representation of the characters and animation needs to be converted to a representation that can be used by the game engine.

SUMMARY

Animation of an object from a character modeling and/or animation tool is converted from a representation used by that tool to a representation used in a runtime animation system, such as a game engine. Such a tool typically represents the object using a source structure and a source skin. The runtime animation engine typically uses a target structure, target skin and shading to represent animation of an object. In addition to transferring motion of the object from its source structure to the target structure, deformation and shading also are converted. Low resolution information about the deformation of the source skin is converted into a set of skinning weights for associating the target skin with virtual bones added to the target structure and animated deformation data for each frame of animation. High resolution detail from the deformation of the source skin is converted into a set of normal maps, one or more masks and animated mask parameters for use by one or more shaders.

This conversion process may be applied by the character modeling and/or animation tool that is used to define the animation of the object, or may be implemented in a separate tool. The conversion process uses the target structure and target skin defined for the object for the runtime animation engine and involves specifying relationships between the source structure and target structure, and specifying relationships between vertices in the source skin and vertices in the target skin.

Motion may be transferred from the source structure to the target structure using motion retargeting techniques. Such techniques are described in U.S. patent application Ser. No. 11/134,653, filed May 20, 2005 and entitled "TRANSFER OF MOTION BETWEEN ANIMATED CHARACTERS", which is hereby incorporated by reference.

Low resolution deformation is provided by the addition of virtual bones to the target structure and by computing skinning weights and per-frame animated deformation data. First, key points, called locators, are placed on the source mesh. The artist may specify which points are locators. These locators are used to specify virtual bones to be added to the target structure, which are parented to the key structures of the target skeleton. The parenting may be defined by a user interface that permits a user to identify which parts of the mesh are parented to which key structures of the skeleton. The skinning weights are computed by identifying points on the target mesh that correspond to locators. These identified points on the target mesh are associated with the virtual bones that were added to the target structure. Each identified point has a skinning weight of 100% for its corresponding virtual bone. Weights for other points in the target mesh are determined according to the weighted topological distances to the closest points in the target mesh that correspond to locators.

Per-frame animated deformation data also are calculated. For each frame, the displacement of each key point (locator) on the source mesh with reference to the bone with which it is associated is computed. The user may indicate the relationship between points in the mesh to bones in the source structure through a parenting map, which may defined by painting on the mesh in a display. This displacement of each locator is transformed to the local space of the virtual bone corresponding to this locator which was added to the target structure. The set of transformed displacement values for each locator for each frame is the set of animated deformation data. As a result, when each virtual bone is moved by the animated deformation data at runtime, the mesh is deformed by virtue of the skinning of the mesh to these animated virtual bones.

To generate information for shading, two normal maps are computed. The first normal map is computed as the difference between the base pose of the source skin and the base pose of the target skin. The second normal map is computed as the difference between the source skin in a stressed state and the base pose of the target skin. These normal maps capture the detailed, high frequency, variations in the source skin, which then are applied to the target skin through shading.

Shading also uses one or more masks and corresponding animated mask parameters. Each mask is associated with a region of the source skin, which may be associated with a deformer used by the tool. Each mask and its corresponding animated mask parameters define blending parameters which control how much the second normal map is blended with the first normal map to provide a normal map to be used by the runtime shader. More masks may be used to provide higher resolution control of the blending of the normal maps. A user interface may be provided to permit a user to edit these masks. These masks are multiplied together and scaled based on per frame animated mask parameters. For each frame of animation in the tool, the animated mask parameters that scale each mask are computed. The level of stress in a region of the source skin that is associated with a mask is computed in each frame to provide this parameter for the mask. As a result, when the masks are scaled by the animated mask parameters and blended together, the stressed normal map for a region is exposed based on the level of stress in the region to create an illusion of subtle deformation detail.

The transferred motion, virtual bones, skinning weights, per-frame skinning deformers, normal maps, masks and per-frame animation mask parameters are provided to the game engine. Given the shaders, target skin and target skeleton, the information provided to the game engine is sufficient for it to reproduce with high fidelity the animation, and particularly the deformation of the mesh of the source object, as generated by the source tool.

DETAILED DESCRIPTION

Figure 1:
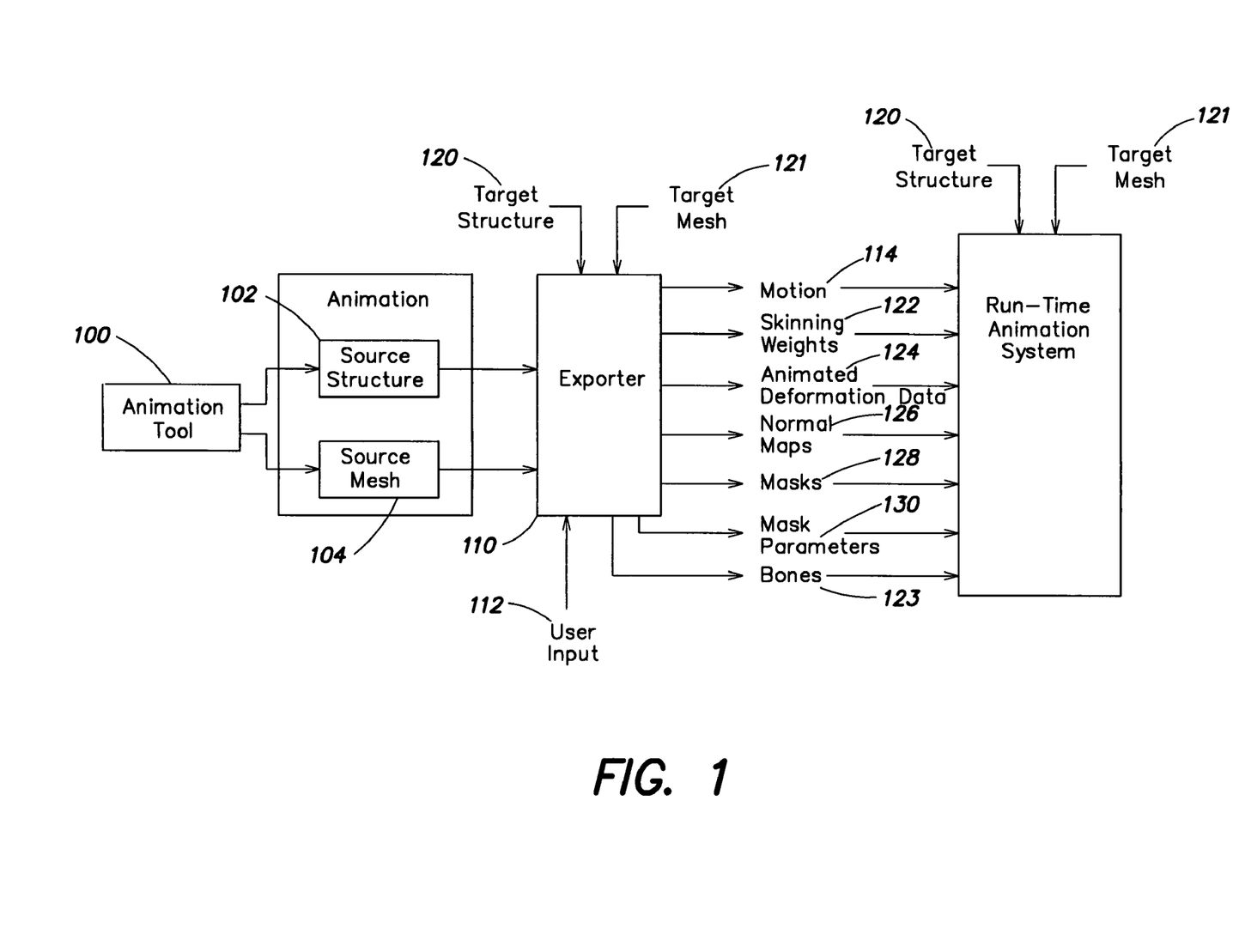
FIG. 1 is a data flow diagram illustrating how a character and animation from one tool can be converted to data for use in a game engine.

Referring now to FIG. 1, the conversion of characters and animation from one character modeling or animation tool to a representation used in a runtime animation system will now be described.

The animation tool 100 permits a user to define a character or other object and associated animation. The character or other object may have an underlying structure such as a skeleton, called source structure 102, and a surface, called source mesh 104. An exporter 110 converts the representation of the character and animation to a format to be used by the runtime animation system. This conversion is done by a. converting low resolution deformation into a set of virtual bones 123 to be added to the target structure 120, skinning weights 122 for associating point in a target mesh 121 to the virtual bones, and animated deformation data 124 for each frame of animation, and b. converting high resolution deformation detail into a set of normal maps 126, a set of one or more masks 128, per-frame animated mask parameters 130 for each mask, to be used by a set of one or more shaders 132. This information can be used by a runtime animation system to play back an animated character in real time. In particular, the target structure, target mesh, virtual bones, skinning weights and animated deformation data are used for runtime skinning, whereas the normal maps, masks, animated mask parameters and shaders are used for runtime shading.

To perform this conversion, the exporter receives user input 112 and a specification of the target structure 120 and target mesh 121 in addition to the source animation. The source animation includes a source structure and a source mesh. The target mesh may be the same as the source mesh, but typically has a lower resolution than the source mesh. The source structure and target structure also typically are different.

Motion may be transferred from the source structure to the target structure using motion retargeting techniques. Such techniques are described in U.S. patent application Ser. No. 11/134,653, filed May 20, 2005 and entitled "TRANSFER OF MOTION BETWEEN ANIMATED CHARACTERS", which is hereby incorporated by reference. The retargeted motion 114 can be used by the runtime animation system to manipulate the target structure.

Low resolution deformation information is generated in two parts. First, virtual bones are added to the target structure, and skinning weights for associating the target mesh to the virtual bones are defined, based on the key points (called locators) in the source mesh as identified by the user. Second, per-frame animated deformation data is generated based on the deformation of the mesh at these key points in each frame of animation.

Initially, the exporter displays the source mesh and the target mesh and permits the user to align the two meshes in position, orientation and scale. Given the aligned meshes, the exporter can determine a transform between the source mesh coordinate space and the target mesh coordinate space.

The exporter displays the source mesh and the user is permitted to identify locations, called "locators," on vertices of the source mesh. Locators are placed by the user at anchor positions in areas of the greatest deformation, and every major deformation area should have at least one locator. The user interface displays the source mesh and permits a user to simply paint the mesh or select points on the mesh to indicate the desired locators. A locator has a position on the mesh, an orientation (normal to its point on the surface) and a spin. The user can control the position of each locator and its spin. Each locator is used to define a virtual bone that is parented to a corresponding bone in the target structure, based on parenting information between the mesh and the skeleton of the character.

Figure 2:
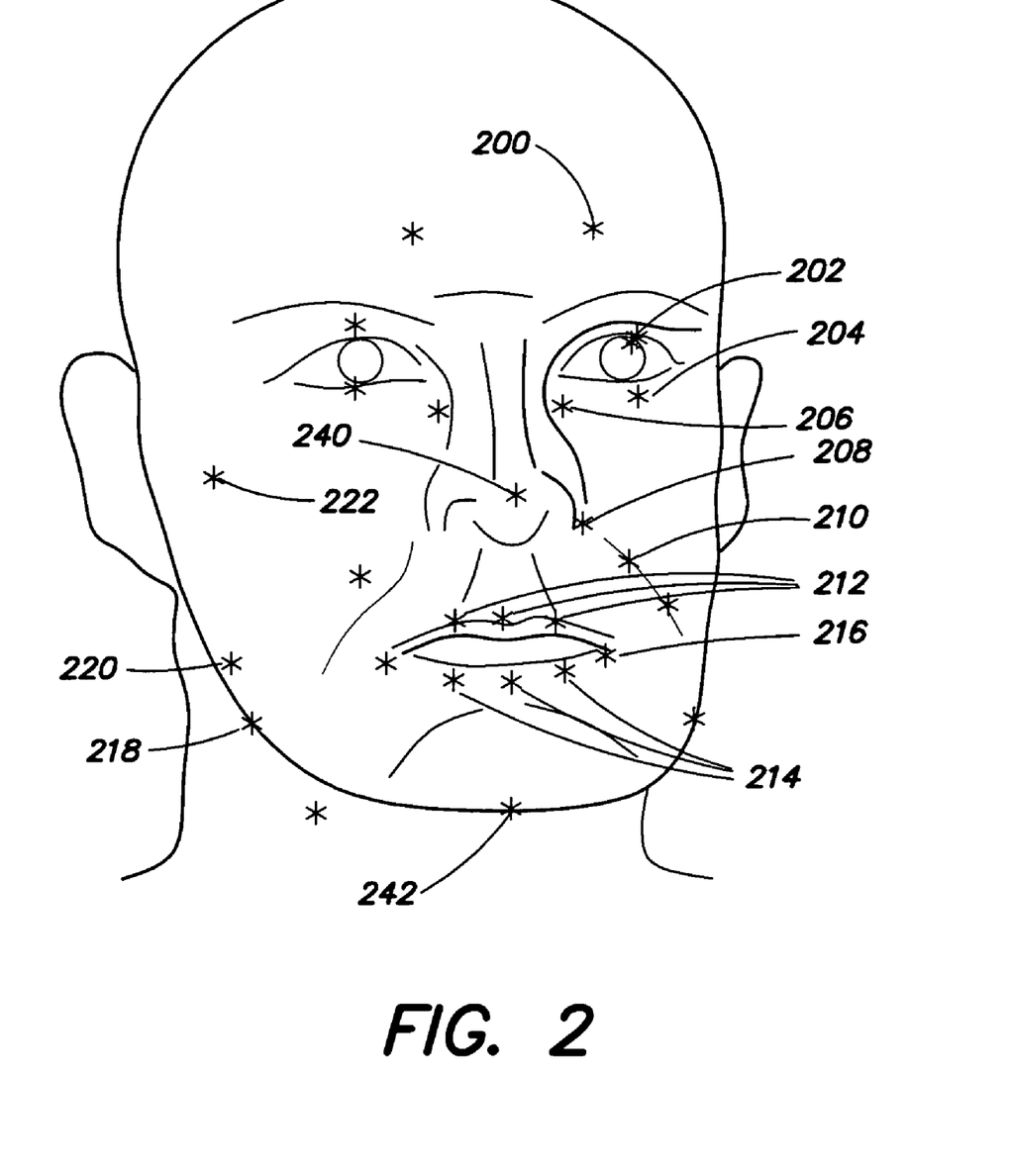
FIG. 2 is a user interface describing how locators are identified.

FIG. 2 illustrates where some locators may be placed when exporting information about a face animation. For example, a locator may be placed at each of the following points on both the left and right sides of the face: inner brow 200, top of the eye 202, bottom of the eye 204, nose side 206, nostril 208, nasal labial fold 210, above lips 212, below lips 214, mouth corner 216, jaw bone 218, cheek puffer 220, cheek bone 222. Some locators may be placed near the center of the face, such as the nose tip 240, and chin 242.

Figure 3A:
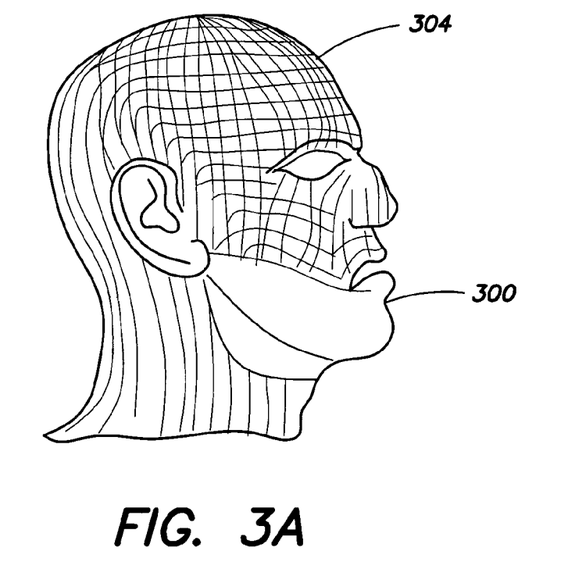
FIG. 3 is a user interface describing how parenting is identified.
Figure 3B:
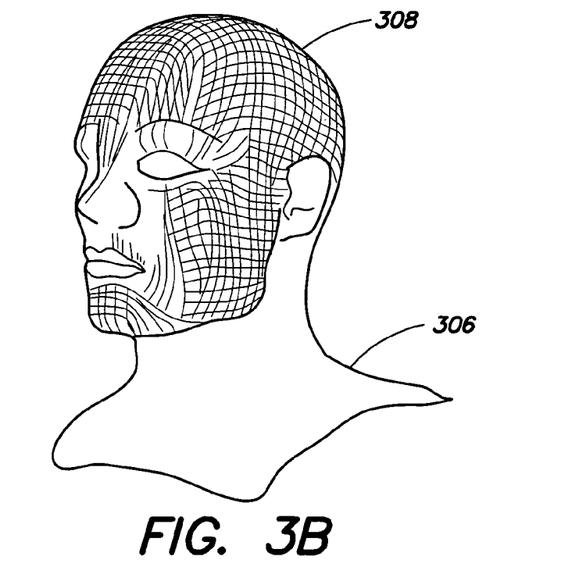

The exporter permits the user to identify the parenting of each point in the mesh to each bone in the skeleton. For example, it may provide a user interface that displays the mesh, and, for each bone of the skeleton, permits the user to paint the mesh as a way to identify those vertices associated with the selected bone. If the relationships between the source mesh, source skeleton, target skeleton then target mesh are provided, this parenting can be done once to specify how each point in the source mesh is parented to each bone in the target structure. This parenting indicates the area of the mesh which is deformed by motion of the associated bone. FIG. 3A illustrates typical parenting for a jaw bone, whereas FIG. 3B illustrates typical parenting for a neck bone. In FIG. 3A, points 300 are indicated as being associated with the jaw bone (not shown). Points 304 are not associated with the jaw bone. In FIG. 3B, points 306 are indicated as being associated with a neck bone. Points 308 are not associated with the neck bone.

Given the virtual bones defined through the locators, the skinning weights are computed by identifying points on the target mesh that correspond to the locators. The identified points on the target mesh are associated with the virtual bones in the target structure. Each identified point has a skinning weight of 100% associating it to its corresponding virtual bone. Weights for other points in the target mesh are determined according to the weighted topological distances to the closest points in the target mesh that correspond to locators.

Figure 4:
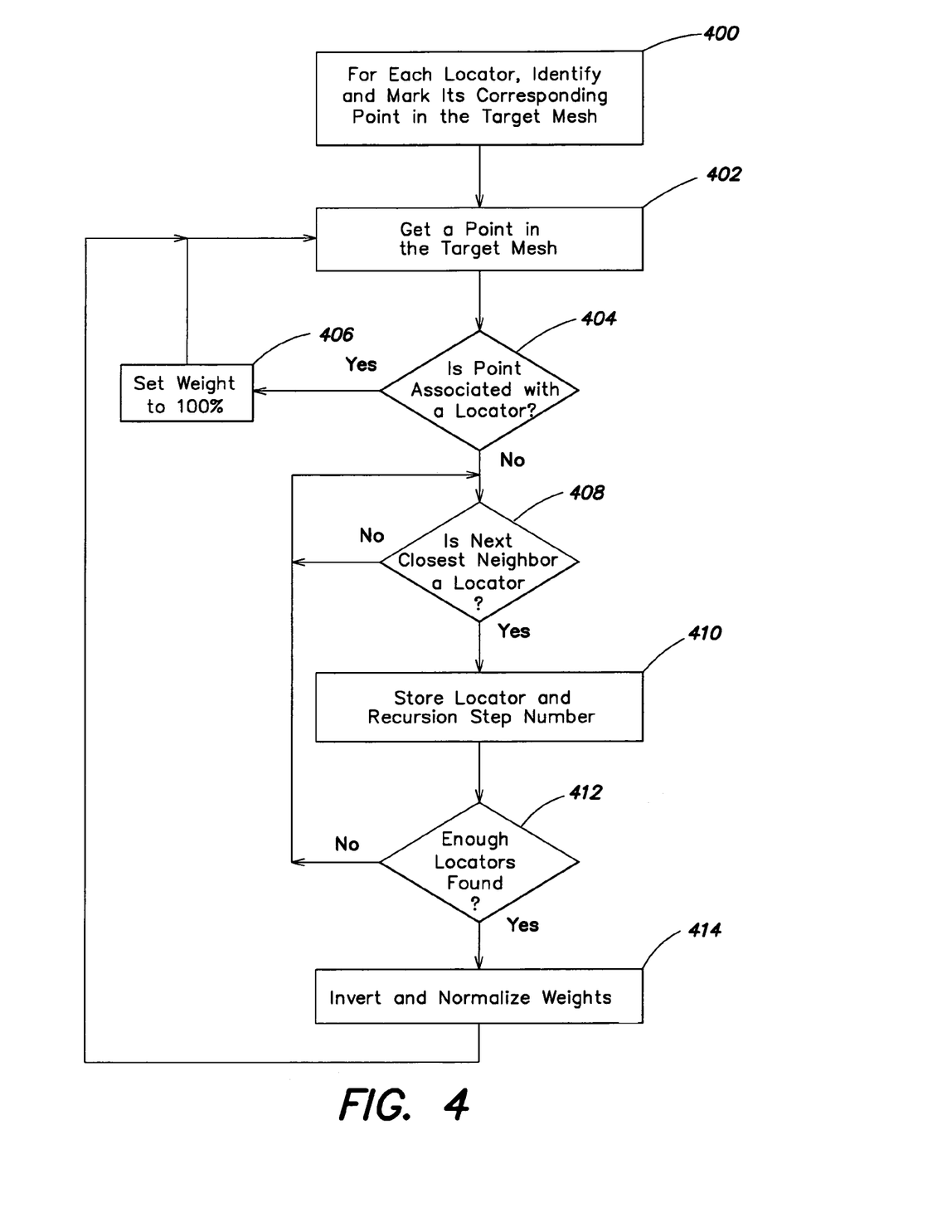
FIG. 4 is a flow chart describing how skinning weights are computed for the target mesh and target structure.

In particular, referring now to FIG. 4, for each locator (10-ln) painted by the artist, the closest point in (pl0-pln) in the target mesh is identified (400). The relationship of the point-locator is stored both in the memory of the program and in the locator name. For every point on the target mesh (p), its immediate neighbors (n1) are identified. Information about these points may be cached. For every point of the target mesh, as indicated at 402, if there is a locator associated with it, as determined at 404, then that point receives a weight of 100%, as indicated at 406. Thus, any displacement of the point in the source mesh to which the locator is attached will be applied fully to this point in the target mesh. If the point in the target mesh is not associated with a locator, then a recursive process is applied, examining next each of the neighbors n1, n2, n3 . . . , in order of topological distance. If a neighboring point has a locator associated with it, as determined at 408, an indication of the locator, along with an indication of the recursion step (x) in which it was found, is temporarily stored (410) for that point in the target mesh. The neighboring points are examined until a predefined limit on the numbers of locators to be found is met, as indicated at 412. For example, if the limit is three, the process of evaluating neighbors stops when three locators are found. The recursion step that was stored for each locator is inverted (1/x) and the results are normalized to 100%, which is the skinning normal, as indicated at 414. In this way, the closer the locators are found to each point in the target mesh, the higher their influence on the point. As a result of this process, each point in the target mesh will have an indication of one or more locators and its corresponding weight, with all weights summing to 100%. These skinning weights are relative to the virtual bones added through specifying the locators.

In order to ensure proper coverage, the envelope is smoothed and the weights are clipped again to a designated number of locators per point. Clipping is done by sorting the weights in decreasing amounts, removing the smallest weights and normalizing the remaining weights to 100%. If multiple target meshes are available, different envelopes can be saved—some with more bones per point, some with less.

To further optimize weights so as to fit into compressed data, the weights may be rounded. The precision for this rounding may be user-specified. When rounding, less influential weights can be rounded down with the rounding error added to the most influential weight, so that the sum of the weights for each point remains at 100%.

Figure 5:
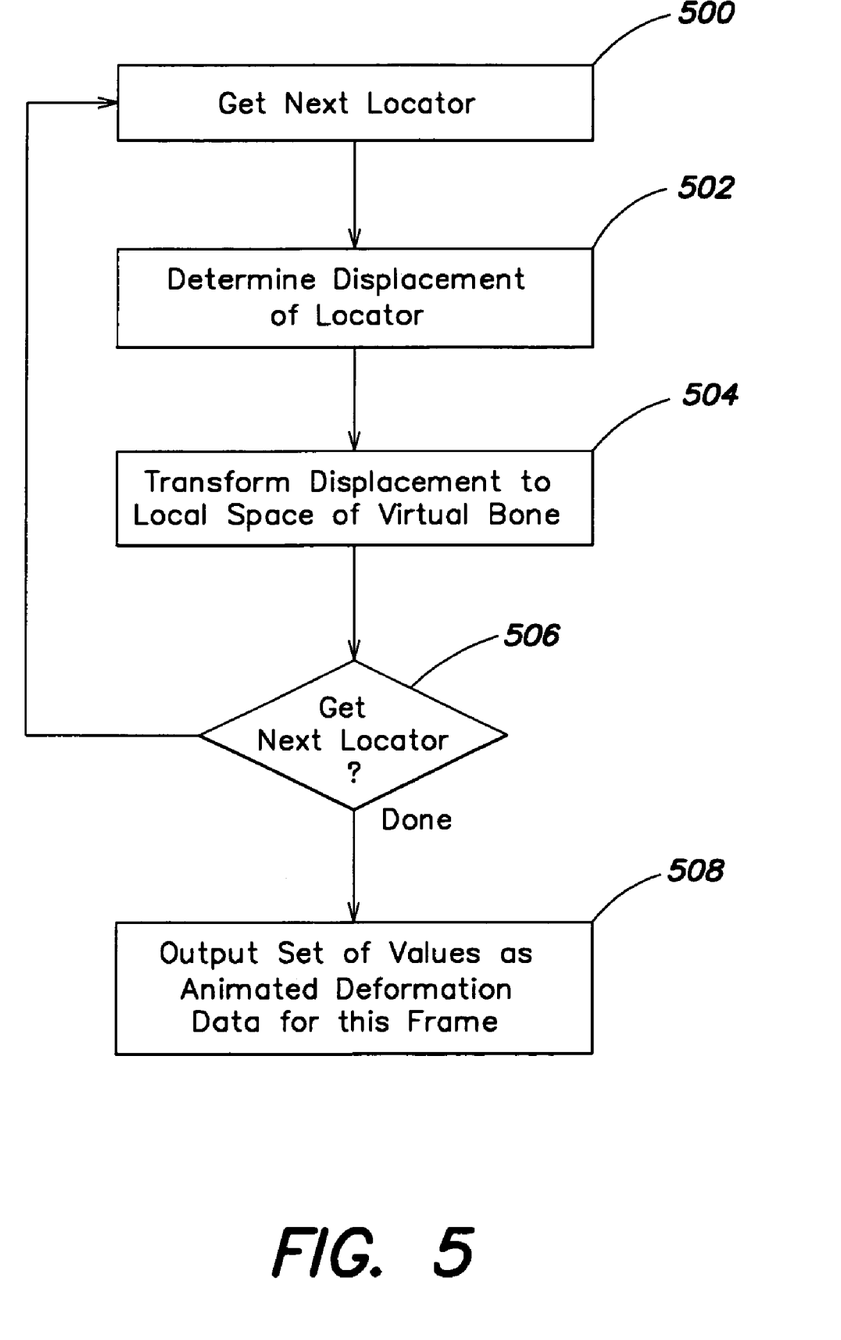
FIG. 5 is a flow chart describing how per-frame animated deformation data are computed.

Referring now to FIG. 5, per-frame animated deformation data are calculated in the following manner. For each frame, each locator (as indicated at 500) is processed. For each locator, its displacement on the source mesh from its base pose, with reference to any movement of the bone with which it is associated, is determined (502). This displacement of each locator is transformed to the local space of its corresponding virtual bone in the target structure (504). If more locators remain to be processed, as determined in step 506, these steps 500, 502 and 504 are repeated for each locator in the frame. The set of transformed displacement values for each locator for each frame is output 508 as the set of animated deformation data. Using this animated deformation data, when each virtual bone is moved by the animated deformation data at runtime, the mesh is deformed by virtue of the skinning of the mesh to these animated virtual bones.

To generate information for shading, two normal maps are computed. The first normal map is computed as the difference between the base pose of the source skin and the base pose of the target skin. The second normal map is computed as the difference between the source skin in a stressed state and the base pose of the target skin. These normal maps enable the conversion to capture the detailed, high frequency, variations in the source skin, which are applied to the target skin through shading.

Shading also uses one or more masks and corresponding animated mask parameters. Each mask is associated with a region of the source skin, which may be associated with a deformer used by the tool. Each mask and its corresponding animated mask parameters defines blending parameters control how much the second normal map is blended with the first normal map to provide a normal map to be used by the runtime shader. More masks may be used to provide higher resolution control of the blending of the normal maps. A user interface may be provided to permit a user to edit these masks. These masks are multiplied together and scaled based on per frame animated mask parameters.

For each frame of animation in the tool, the animated mask parameters that scale each mask are computed. The level of stress in a region of the source skin that is associated with a mask is computed in each frame to provide this parameter for the mask. As a result, when the masks are scaled by the animated mask parameters and blended together, the stressed normal map for a region is exposed based on the level of stress in the region to create an illusion of subtle deformation detail.

A mask can be represented using image data, with each pixel corresponding to a point on the source mesh. Each color component may represent one mask. Thus one image can represent three masks.

Shaders for the runtime engine that correspond to the shaders used in the source tool also are needed. If the shaders in the source tool are implemented, for example, as shader in the OpenGL, CGFX or DirectX formats, then most runtime engines will be able to use the same shaders.

The runtime engine typically colors and textures the surface of an object using the shaders and the blended normal maps. As a character or object is animated over time, the blending of the normal maps through use of the animation masks results in animation of the shading. The shading typically provides high resolution details, such as wrinkles and hair. This technique permits transfer of animation of these characteristics to the runtime engine.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or no writeable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 1 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method for converting animation of an object from a first tool to a representation used in a runtime animation system, wherein the first tool represents the object using a source structure and a source mesh, and wherein the runtime animation engine uses a target structure, a target mesh and shading, the method comprising:
   receiving a source animation including the source structure and the source mesh, the target structure, and the target mesh;
   determining a transform between a source coordinate space of the source mesh and a target coordinate space of the target mesh based on an alignment between the source mesh and the target mesh;
   adding virtual bones to the target structure based on locators within the source mesh that are positioned on the source mesh at major deformation areas, the locators are user identified locations on vertices of the source mesh, each of the locators includes a position on the source mesh, an orientation and a spin;
   computing skinning weights for associating the target mesh to the virtual bones, wherein the skinning weights are computed by identifying points on the target mesh that correspond to the locators;
   processing the locators for each frame of the source animation to transform displacements of each locator from the source coordinate space to the target coordinate space to produce a set of animated deformation data that specifies displacement values of each locator for each frame of the source animation; and
   moving the virtual bones within the target structure based on the set of animated deformation data for each frame of the source animation to convert the animation of the object from the first tool to the representation used in the runtime animation system.

2. The method of claim 1, further comprising retargeting motion from the source structure to the target structure.

3. A computer program product, comprising:
   a non-transitory computer readable storage medium;
   computer program instructions stored on the non-transitory computer readable storage medium that, when processed by a computer, instruct the computer to perform a method for converting animation of an object from a first tool to a representation used in a runtime animation system, wherein the first tool represents the object using a source structure and a source mesh, and wherein the runtime animation engine uses a target structure, a target mesh and shading, the method comprising:
   receiving a source animation including the source structure and the source mesh, the target structure, and the target mesh;
   determining a transform between a source coordinate space of the source mesh and a target coordinate space of the target mesh on an alignment between the source mesh and the target mesh;
   adding virtual bones to the target structure based on locators within the source mesh that are positioned on the source mesh at major deformation areas, the locators are user identified locations on vertices of the source mesh, each of the locators includes a position on the source mesh, an orientation and a spin;
   computing skinning weights for associating the target mesh to the virtual bones, wherein the skinning weights are computed by identifying points on the target mesh that correspond to the locators;
   processing the locators for each frame of the source animation to transform displacements of each locator from the source coordinate space to the target coordinate space to produce a set of animated deformation data that specifies displacement values of each locator for each frame of the source animation; and
   moving the virtual bones within the target structure based on the set of animated deformation data for each frame of the source animation to convert the animation of the object from the first tool to the representation used in the runtime animation system.

4. The computer program product of claim 3, wherein the non-transitory computer readable storage medium further comprising programming instructions for retargeting motion from the source structure to the target structure.

5. The method of claim 1, further comprising the step of identifying points on the target mesh that correspond to the locators and computing a skinning weight of 100% for each of the identified points.

6. The method of claim 5, further comprising the step of determining weights for other points in the target mesh according to weighted topological distances to the closest points in the target mesh that correspond to locators.

7. The method of claim 1, further comprising the step of generating information describing a set of normal maps, one or more masks and animated mask parameters for use by one or more shaders for the runtime animation system.

8. The method of claim 7, wherein a mask and associated animated mask parameters defines blending parameters that control blending of a first normal map and a second normal map to produce one of the normal maps in the set of normal maps.

9. The method of claim 1, wherein the target mesh has a lower resolution than the source mesh.

10. The method of claim 1, further comprising the step of computing a first animated mask parameter for a frame of the source animation based on a level of stress in a region of the source skin that is associated with a first mask.

11. The computer program product of claim 3, wherein the non-transitory computer readable storage medium further comprising programming instructions for identifying points on the target mesh that correspond to the locators and computing a skinning weight of 100% for each of the identified points.

12. The computer program product of claim 11, wherein the non-transitory computer readable storage medium further comprising programming instructions for determining weights for other points in the target mesh according to weighted topological distances to the closest points in the target mesh that correspond to locators.

13. The computer program product of claim 3, wherein the non-transitory computer readable storage medium further comprising programming instructions for generating information describing a set of normal maps, one or more masks and animated mask parameters for use by one or more shaders for the runtime animation system.

14. The computer program product of claim 13, wherein in the programming instructions for generation information, a mask and associated animated mask parameters defines blending parameters that control blending of a first normal map and a second normal map to produce one of the normal maps in the set of normal maps.

15. The computer program product of claim 3, wherein in the computer program instructions stored on the non-transitory computer readable storage medium, the target mesh has a lower resolution than the source mesh.

16. The computer program product of claim 3, wherein the non-transitory computer readable storage medium further comprising programming instructions for computing a first animated mask parameter for a frame of the source animation based on a level of stress in a region of the source skin that is associated with a first mask.

17. The method of claim 1, wherein the source mesh and the target mesh are aligned in position, orientation, and scale to produce the alignment.

18. The computer program product of claim 3, wherein in the computer program instructions stored on the non-transitory computer readable storage medium, the source mesh and the target mesh are aligned in position, orientation, and scale to produce the alignment.

19. The method of claim 8, wherein the mask is represented using image data, with each pixel corresponding to a point on the source mesh.

20. The computer program product of claim 14, wherein in the computer program instructions stored on the non-transitory computer readable storage medium, the mask is represented using image data, with each pixel corresponding to a point on the source mesh.

* * * * *

UNITED STATES PATENT AND TRADEMARK OFFICE
CERTIFICATE OF CORRECTION

| | | |
|---|---|---|
| PATENT NO. | : 7,859,538 B2 | Page 1 of 1 |
| APPLICATION NO. | : 11/496241 | |
| DATED | : December 28, 2010 | |
| INVENTOR(S) | : Isner et al. | |

It is certified that error appears in the above-identified patent and that said Letters Patent is hereby corrected as shown below:

Column 8, line 26, claim 3 please replace "mesh on" with -- mesh based on --.

Signed and Sealed this
Twenty-fourth Day of May, 2011

David J. Kappos
*Director of the United States Patent and Trademark Office*